April 7, 1959 I. MICHALKO ET AL 2,881,005

PHONOGRAPH PICKUPS

Filed Aug. 21, 1956 3 Sheets-Sheet 1

INVENTOR.
I. MICHALKO
F. A. FAILLACE

BY Greene, Pineles & Durr
ATTORNEYS

INVENTOR.
I. MICHALKO
F. A. FAILLACE
BY Greene, Pineles & Durr
ATTORNEYS

April 7, 1959 | I. MICHALKO ET AL | 2,881,005

PHONOGRAPH PICKUPS

Filed Aug. 21, 1956 | 3 Sheets-Sheet 3

INVENTOR.
I. MICHALKO
F. A. FAILLACE

BY Greene, Pineles & Durr
ATTORNEYS 2,881,005

PHONOGRAPH PICKUPS

Ignatius Michalko, Ossining, and Frank A. Faillace, Eastchester, N.Y., assignors to Sonotone Corporation, Elmsford, N.Y., a corporation of New York Application August 21, 1956, Serial No. 605,307

4 Claims. (Cl. 274—37)

This invention relates to phonograph pickups, and more particularly to phonograph pickups which are utilized for transducing undulations of record traces, usually in the form of an undulating record groove, into corresponding electric signal waves.

Although the present invention was evolved in connection with phonograph pickups intended for use with laterally cut record groove traces generally used in making conventional phonograph records, and specific exemplifications of such pickups will be herein described, the principles of the invention are also applicable for pickups designed for use with vertically cut record grooves.

Most generally used phonograph pickups have a mechano-electric transducer which is driven by a stylus engaging the moving record groove of the record disc or the like for translating the undulations of the record trace into corresponding electric signals. The stylus is usually carried on the forward end of a transducer drive-rod which transmits the undulations of the stylus to the transducer.

If phonograph pickups of the foregoing type are to be used for high-fidelity reproduction of records, it is of utmost importance to secure a constant or smooth frequency response for driving forces applied to the stylus by or representing the undulations of a high fidelity record of the audible frequency spectrum. In practice, fluctuations of the frequency response are difficult to eliminate without interfering with other design requirements of a phonograph pickup. As a result, prior-art pickups had to be provided with cumbersome and complicated structures in order to achieve with them the desired smooth frequency response over the required frequency spectrum.

Among the objects of the invention is a simplified guide structure for a turnable stylus-carrying transducer drive rod rotatable relatively to the transducer structure of such phonograph pickup. More particularly, among the objects of the invention is a guide structure for such turnover stylus-carrying transducer drive rod wherein a single metallic structure has formed therein bearing elements along which such transducer drive rod is rotatably guided in its rotation between its two stylus positions, and another portion of the same integral sheet member holds the stylus drive rod in engagement with said bearing elements and permits detachable mounting and replacement of the stylus-carrying transducer drive rod in its operative position.

The foregoing and other objects of the invention will be best understood from the following description of exemplifications thereof, reference being had to the accompanying drawings, wherein:

Fig. 1 is a side elevation of the complete pickup of the invention, with a side wall thereof removed to expose the interior elements of the pickup assembly;

Fig. 1–A is a side view of the side wall removed from the casing shown in Fig. 1 as seen from the interior of the casing;

Fig. 2 is a cross-sectional view along lines 2—2 of Fig. 1;

Fig. 2–A is a cross-sectional view along lines 2–A, 2–A of Fig. 1;

Fig. 3 is a side view similar to Fig. 1 of the piezoelectric transducer unit only;

Fig. 3–A is a cross-sectional view along lines 3–A, 3–A of Fig. 3;

Although the principles of the invention are applicable to phonograph pickups having one transducer driving stylus, for instance for reproducing sound records of only one type of record such as the high-fidelity records known as LP records on discs rotating at 33 r.p.m., the principles of the invention will first be explained in connection with a phonograph pickup having two selectively settable styli for reproducing signals from relatively deep record grooves rotating at 78 r.p.m. or from relatively shallow record grooves rotating at 33 r.p.m. Furthermore, although the phonograph pickups of the invention may be operated with any of the known types of mechano-electric transducer structures including those utilizing magnetic structures, electrical resistance elements and piezoelectric structures for converting mechanical strain or motion into electric signals, and with any type of connection between the groove-engaging stylus and the transducer structure—the present invention will be described in connection with a pickup structurally similar to that described in Klingener Patent No. 2,717,929 and operating with a permanently polarized ceramic titanate transducer.

Figures 1, 1A, 2, 2A, 3, 3A:
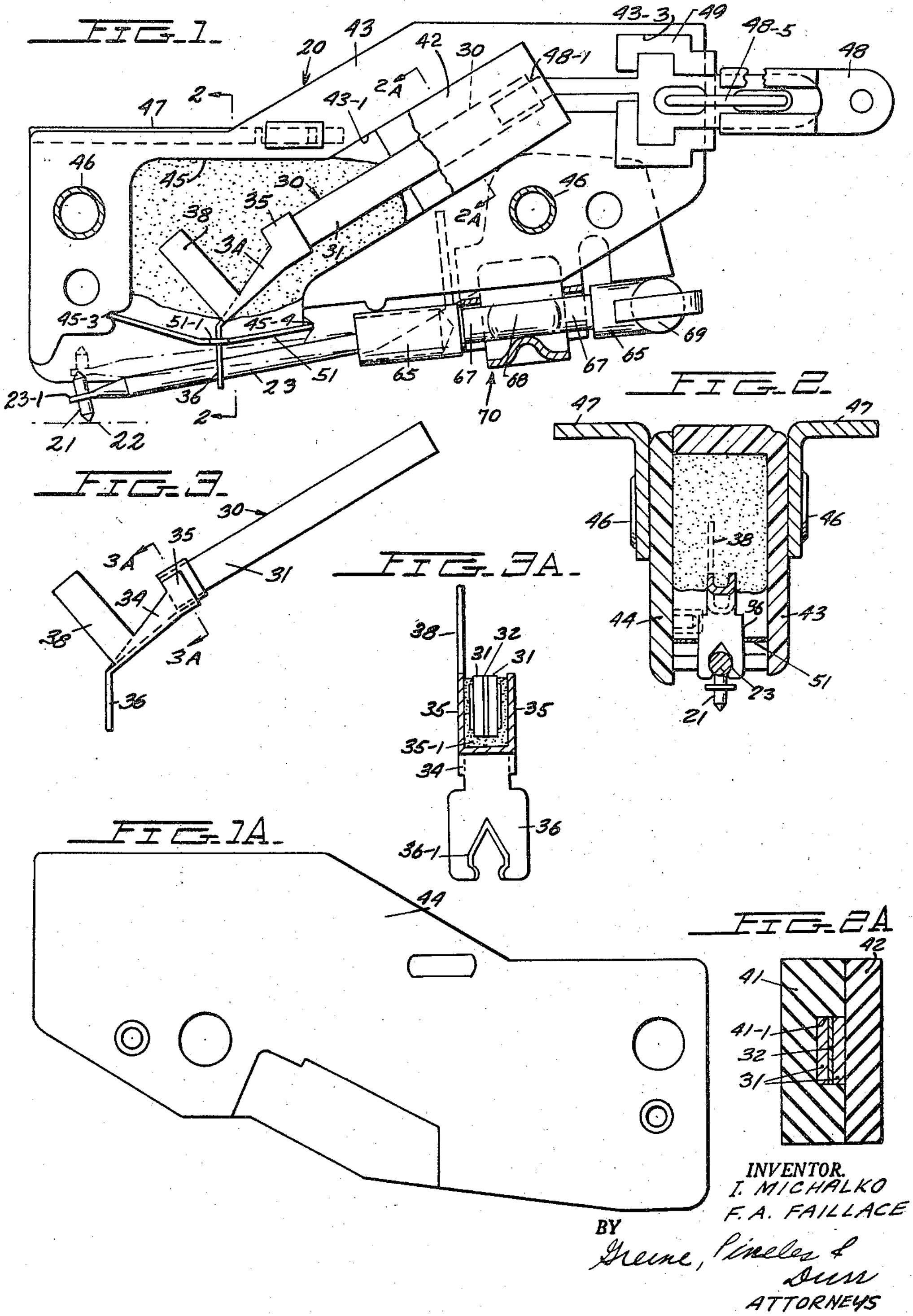

Figs. 1–6 show one form of a pickup 20 exemplifying the invention. Fig. 1 shows the pickup 20 in its operative position held on the downwardly facing side of the front end of a tone arm (not shown), with one of its two styli 21 engaging a record groove trace indicated by dash-double-dot line 22, and representing the spiral record groove of a record disc moving in a forward record-playing direction (or from right to left in Fig. 1) which is also substantially tangential to the circular record groove trace 22. The stylus 21 is held in the forward end of a stylus drive rod 23 which extends substantially in a vertical plane through the forward playing direction of the record groove trace 22 in generally the same direction. The phonograph pickup of Fig. 1 is designed for operation with a laterally cut record groove 22 which imparts to the stylus a lateral undulatory motion, but as explained above, the pickup of the invention may be designed for operation with a vertically cut record groove.

The pickup (Figs. 1–6) comprises a mechano-electric transducer generally designated 30 (Fig. 3) shown formed of two strip-like ceramic titanate elements 31 having fused exterior metal electrodes, and which are united to the opposite sides of a strong, flexible resilient metal strip 32 along their facing surfaces so as to maintain at least the adjacent stratum of the two ceramic titanate strips under compressive strain and prevent fracture thereof when they are subjected to the undulatory bending motions in a direction perpendicular to their extended strip surfaces.

By way of example, each transducer element 31 of a particular pickup, may be formed of a dielectric ceramic layer consisting essentially of barium titanate having a thickness of about 0.10 inch, a width of about 3/64 of an inch, and a length of about 3/4 of an inch. The metallic backing strip may have a thickness of about 0.005 inch, and the same longitudinal and lateral dimensions as the piezoelectric elements 31 that are secured thereto by a solidified solder stratum which maintains at least the adjacent strata of the ceramic elements 31 under compressive strain.

The forward end of the lever-like strip-shaped transducer 30 is drivingly coupled to the stylus drive rod 23, the forward end of which carries two oppositely projecting styli 21. The forward portion of the transducer 30 has secured thereto an elongated drive extension 34 extending downwardly and forwardly therefrom for coupling engagement with the stylus drive rod 23. The drive extension 34 is shown formed of a metal strip bent into a channel shape of the required stiffness and having at its rear, U-shaped bent arms 35 which are insulatingly affixed as by suitable insulating cement 35–1, with or without an interposed insulating strip, to the forward drive portion of the transducer strip 30 so as to form an integral fixed drive extension thereof. At its downward front end, the drive extension 34 has a flat coupling portion 36 with a coupling recess 36–1 shaped for receiving therein and detachably holding in coupling driving engagement the forward region of the elongated stylus drive rod 23. The stylus drive rod 23 may be formed of a solid or tubular strip of metal having a flattened front end 23–1 in which the two oppositely directed styli 21 are secured.

The rear part of the piezoelectric transducer 30 is held restrained against motion by holding it embedded in an elastomer body 41, 42 (Fig. 2–A) of plasticized elastomer substance arranged to exert on the embedded transducer portion reaction forces resisting deformation of the transducer 30 so that bending forces imparted to its forward end generate therein corresponding electric signals impressed on its external surface electrodes. The elastomer body 41, 42 may be formed of a material such as a vinyl chloride compound or the like which embodies sufficient plasticizer substance so that when the forward end of transducer 30 is subjected to lateral undulatory bending forces in a direction perpendicular to its flat major surface (shown extending in the plane of Fig. 1), the elastomer body 41, 42 will restrain the motion and deformation of the transducer 30 and cause it to generate corresponding electric output signals by proper distribution of the applied mechanical strains throughout its ceramic piezoelectric layers 31. In the form shown, the elastomer pad or body 41 constitutes a block-like structure of rectangular cross-section provided with a recess 41–1 in which the rear part of the piezoelectric transducer 30 fits, the transducer 30 being held clamped in the recess 41–1 of the elastomer body 41 by the complementary elastomer body 42 which has a rectangular cross-section complementing the cross-section of the elastomer body 41.

The complementary elastomer bodies 41, 42 are held clamped in their proper operative positions in which they hold clamped therein the rear part of the strip-like elongated piezoelectric transducer 30 by walls of a casing structure shown consisting of a hollow casing 43 with a complementary cover wall 44 (Fig. 1–A). The casing 43 and its complementary cover wall 44 are rigid, and in the form shown, they are made of cast metal. The inwardly facing side of casing 43 has formed therein an elongated, rectangular compartment 43–1 shaped to hold clamped therein the elongated transducer-restraining elastomer body 41, 42 and a forward compartment 45 into which the driven forward end of the transducer 30 extends. The cover wall 44 is held clamped to the casing 43 in their assembled position in which they enclose the compartment spaces 43–1 and 45 by suitable clamping means such as two hollow rivets 46 extending through suitable fastening holes formed in the front end and the rear portions of the casing walls 43, 44. Two metallic mounting brackets 47 may be affixed to the exterior of the casing walls 43, 44 by the forward rivet 46 (Fig. 2).

Two strip-like external terminal members 48 of sheet metal have their inward end portions 48–1 held clamped in contact with the exterior surface electrodes of the two titanate ceramic layers 31 of transducer 30 by the overlying elastomer bodies 41, 42 within which the transducer rear part is held clamped. The strip-like terminal members 48 are held assembled in a cavity of an insulating terminal mounting member 49 (Figs. 1 and 9) formed, for instance, of insulating molded material, the two metallic terminal strips being held insulated from each other by a spacing member of molded insulating material held affixed as by cement within the recess or cavity of the terminal mounting member 49. The terminal mounting member 49 of insulating material is held clamped in assembled position within a casing recess 43–3 of the casing 43 by the two metallic casing walls 43, 44. To provide a grounding connection for one of the exterior surface electrodes of the transducer 30, one of the strip-like terminal members 48 is provided with a cut-out inward grounding tongue projection 48–5 overlying the insulating terminal mounting member 49. The outer metallic contact wall 44 of the casing makes contact with the grounding part or tongue 48–1 of the external terminal member 48, thereby establishing a grounding connection for one of the external surface terminals of the piezoelectric transducer 30.

Proper mounting of the terminal mounting member 49 and its assembled terminal 48 in contact engagement with the external surfaces of the transducer assembly 30, may be effected as follows: After first assembling the recessed elastomer pad 35 in the rear compartment 43–1 of the casing 43, the terminal assembly 49 with its two insulated terminal member strips 48, is placed in the terminal assembly recess 43–3 of the casing 43 so that the two inward terminal contact strip ends 48–1 occupy positions in which they are clamped into electric contact with the surface electrodes of the transducer 30 when it is assembled between the two elastomer pads 41, 42.

Thereupon the rear part of the transducer assembly 30 is slipped into its position within the rectangular recess 41–1 of the elastomer pad so that the external surface electrodes of the two piezoelectric ceramic layers 31 of the rear part of the transducer 30 make contact with the inner terminal ends of the two terminal strips 48. Thereupon the outer elastomer pad 44 is assembled within the remaining space of the rear compartment 43–1 so as to overlie the assembled complementary inner elastomer pad 41 with the transducer 30 assembled therein together with the inner contact ends 48–1 of the two terminal members 48 for clamping them together in respective contact engagement when the complementary casing wall 44 is assembled over and secured to casing 43.

Except for the stiffer drive extension 34 and the replacement of the forward elastomer body restraint with the rearward elastomer body 41, 42, the phonograph pickup assembly described above is similar to that of Klingener Patent 2,717,929, and its frequency response has fluctuations which are difficult to eliminate.

In the phonograph pickup of Figs. 1–6, the stylus drive rod 23 with its two styli 21 carried at the front end thereof, is provided at its rear end with a relatively rigid enlarged generally cylindrical mounting or pivot member 65 forming with it a detachable stylus drive structure. The cylindrical pivot member 65 serves as a mounting portion of the stylus drive rod 23, and is rotatably seated within a guide structure 70 held affixed to the bottom region of the rear part of the pickup mounting structure or casing 43, 44. The cylindrical pivot member 65 of the stylus drive structure has an intermediate seating section 67 of somewhat reduced diameter, which is adjoined by wider portions of the stylus pivot member 65 which form seating limits thereof. The intermediate part of the seating section 67 of the stylus pivot member 65 has an eccentrically offset or bent bias element 68 which serves, as explained hereinafter, to automatically bring the stylus drive rod structure to one or the other of the opposite end positions when it is rotated past an intermediate position from one groove-engaging stylus position to the other. The relatively wide mounting member 65 of the stylus drive rod 23 is formed of hollow tubing, and holds in its open end an elongated elastic elastomer body (not shown) in which the flattened rear end of the light tubular stylus drive rod 23 is positioned or embedded, this elastomer body forming the sole connection between the stylus drive rod 23 and its rigid metallic mounting member 65.

The casing or mounting structure 43, 44 of the pickup is provided with a guide structure 70 arranged to operatively hold therein the seating region of the mounting member 65 of the stylus drive rod or the stylus drive structure 23, so that it may be rotated around its axis from one operative groove-engaging stylus position to the opposite stylus position. The stylus rod pivot member 65 has a laterally extending grip 69 to facilitate turning of the stylus drive rod 23 to its opposite stylus positions.

In accordance with the present invention, all elements of the guide for the stylus drive rod 23 are formed of a single, integral sheet member having mounting portions with which it is secured or affixed to the mounting or casing structure of the pickup, and also seating and biasing elements by means of which the seating portion 67 of the mounting member 65 of the stylus drive rod structure 21 is held in its operative position adjacent the transducer structure 30 of the pickup for rotation between its two different stylus positions, and also permitting detachable removal and replacement of the stylus drive structure 23 from and into its operative position in the pickup.

Figures 4, 5:
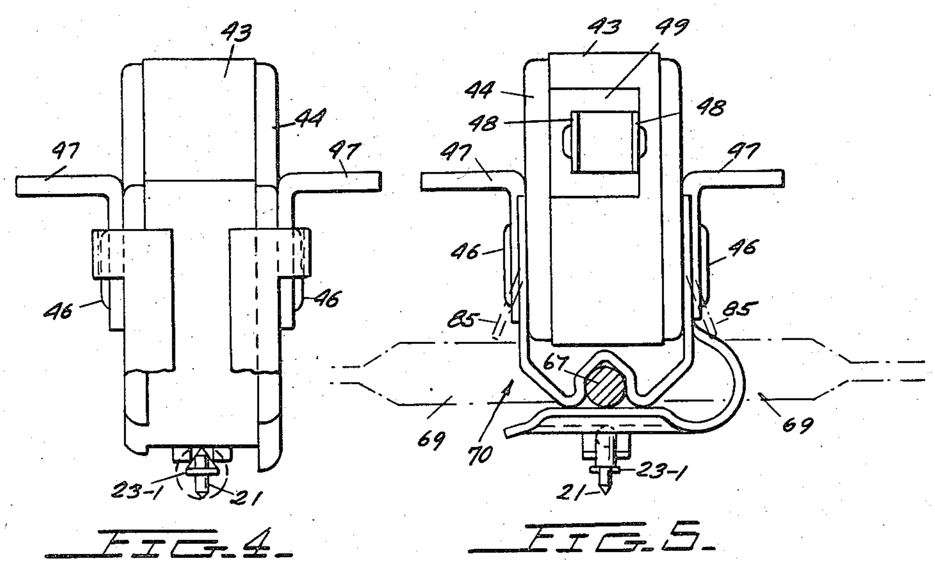
Fig. 4 is a front end view of the pickup as seen from the left in Fig. 1.
Fig. 5 is a rear end view of the pickup as seen from the right of Fig. 1.
Figure 6:
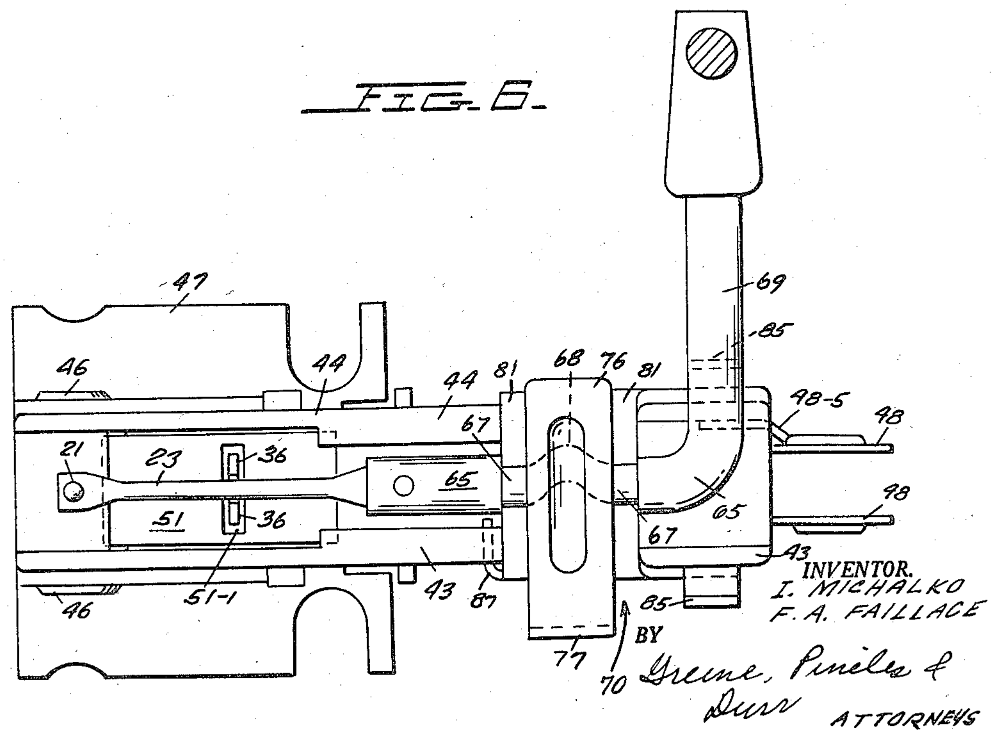
Fig. 6 is a bottom view of the pickup of Fig. 1.
Figure 7:
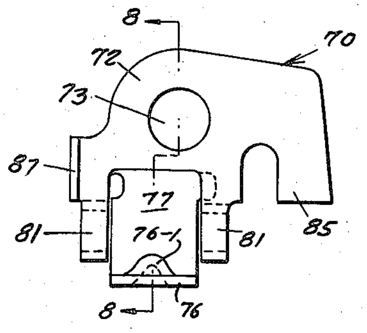
Fig. 7 is a side view of the guide structure for the stylus drive rod of the pickup of Figs. 1 to 6.
Figure 8:
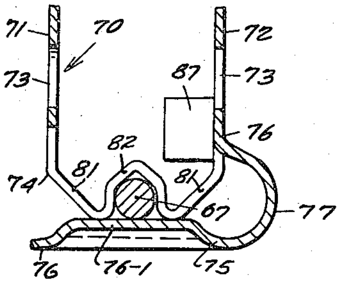
Fig. 8 is a cross-sectional view along lines 8—8 of Fig. 7.
Figure 9:
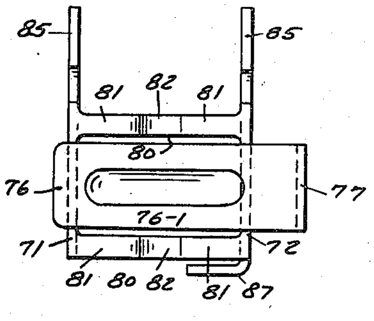
Fig. 9 is a bottom view of the guide structure of Figs. 7 and 8.

Figs. 1, 5 and 6 show the guide structure 70 of the stylus drive rod as it is mounted or affixed on the casing structure 43, 44 of the pickup, Figs. 7, 8 and 9 being side, cross-sectional, and bottom views of the gride structure 70 itself, without the pickup. Referring to these figures, the guide structure 70 is formed of a sheet member of spring material, such as sheet metal, generally bent into a U-shaped structure having two side arms 71, 72 shaped to overlie and engage the exterior surfaces of the casing side walls 43, 44, and to be held secured thereto by the rivet 46 passing through holes 73 in the side arms. The guide structure sheet member 70 has an intermediate elongated seat region 74 extending transversely between its two side arms 71, 72. The seat region 74 has a cut-out retainer or bias tongue portion 75 extending from a transverse edge 76 of an opening 80 formed in sheet member 70. The sheet opening 80 is bordered by two side seating sections 81 of the intermediate seating region 74 of the sheet structure 70. Each of the two border or seating sections of sheet member 70 adjoining its opening 80, has a bent reentrant seat portion 82 which provide rotary bearing seats for the intermediate cylindrical seat region 67 of the mounting member 65 of the stylus drive rod for holding it rotatably in its operative position in the pickup. The end portion 76 of the retainer tongue 75 of the guide sheet 70 is stiffened by a longitudinal rib deformation 76–1, and forms a locking or bias end part thereof, and it is held in operative position by its arcuate springy rear junction portion 77 so as to be pressed by the restoring forces of its elastically deformed spring structure against the central region 68 of the seating region 67 of the stylus drive rod mounting structure 65 for holding and retaining it within the seating section 82 of the guide sheet structure 70. The outwardly curved arcuate junction portion 77 of the retaining tongue 75 of the guide structure has sufficient length so as to store therein enough elastic restoring energy when it is in the position shown in Fig. 8, so as to exert on the intermediate bias portion 68 of the stylus drive rod seating region 67 sufficient bias forces to assure that it is held in its operative position within the recessed seating portions 82 of the guide structure 70 in which the stylus drive rod 23 is positively retained in its operative position in the pickup, as seen in Figs. 1–6. Furthermore, the outwardly curved junction portion 77 of the retaining tongue 75 of the guide structure 70, is designed and proportioned to store therein sufficient elastic restoring energy so as to permit outward flexing of the locking end part 76 of the retainer tongue 75 for removing the seating section 67 of the stylus drive rod mounting member 65 from the seats 82 of the guide structure for replacing a given stylus drive structure with another similarly seated stylus drive structure similarly held and retained in operative position against the seats 82 of the guide structure 70.

As seen in Figs. 1, 5–9, the edge portions of the two guide structure side arms 71 which face toward the rear of the pickup (as seen to the right in Figs. 1 and 7) have downward stop extensions 85 which are engaged by the lateral grip arm 69 of the pivot member 65 of the stylus drive rod 23 whenever it is brought to either one of the two stylus positions. The eccentrically offset arcuate intermediate bias portion 68 of the seating region 67 of the pivot member 65 of the stylus rod 23, is so arranged that the biasing forces exerted thereon by the deformed stiffening ridge 76–1 of the locking end 76 of the retainer tongue 75 cause it to be turned to either one of the two stylus positions of the stylus drive rod 23 when the bias portion 68 is turned by the turn grip 69 past the intermediate neutral position when bringing the stylus drive rod from one stylus position to the opposite stylus position.

The guide member 70 is also provided with a retainer lip 87 extending from the mounting arm 72 thereof and turned inwardly therefrom (Figs. 8, 9) and shaped to fit into a slit formed in the exterior side of casing wall 43 of the pickup, thereby facilitating assembly of the guide structure 70 in its proper operative position on the casing 43 of the pickup.

The features and principles underlying the invention described above in connection with specific exemplifications, will suggest to those skilled in the art many other modifications thereof. It is accordingly desired that the appended claims shall not be limited to any specific features or details shown and described in connection with the exemplifications thereof.

We claim:

1. In a phonograph pickup having an elongated stylus drive structure carrying at its free end two differently directed styli and a coaxial relatively rigid stylus seating portion arranged for rotating said drive structure relatively to the transducer of said pickup, a guide structure secured to said pickup for guiding and rotatably supporting the seating portion of said drive structure so that it may be rotated for bringing either one of said styli into a record-engaging operative position, said guide structure comprising an integral sheet member of spring material having a generally U-shaped sheet section with two opposite side arms secured to said pickup, the intermediate part of said U-shaped sheet section extending between said side arms having cut therefrom an elongated tongue extending in a direction transverse to said stylus drive structure, and having two spaced parallel elongated border strips of said spring material extending integrally from said side arms, said border strips bordering the elongated opening in the intermediate sheet section corresponding to said tongue, the central region of each of said two border strips being in the form of a recessed saddle aligned to constitute two spaced coaxial bearing surfaces for engaging two spaced regions of one side of the stylus seating portion of said drive structure, said border strips of spring material each spanning substantially across the pickup between said side arms to form two coaxial bearing mounts for the stylus seating portion, said tongue having a relatively long elastic junction region extending integrally from one side arm and elastically bent outwardly away from said stylus drive structure and an end region held biased by the elastic restoring forces of said bent junction region to overlie and yieldably clamp said stylus seating portion in its operative position against said coaxial bearing mounts, the length of said tongue being at least twice the distance from its end where joined to said one arm up to the stylus seating portion engaged thereby.

2. A guide structure for a stylus drive structure of a phonograph pickup as claimed in claim 1, one of said side arms having an aligning sheet projection extending from an edge thereof inwardly towards a body portion of said pickup for fixing the operative position of said guide structure relatively to other portions of said pickup.

3. A guide structure for a stylus drive structure of a phonograph pickup as claimed in claim 1, one of said side arms having an aligning sheet projection extending from an edge thereof inwardly towards a body portion of said pickup for fixing the operative position of said guide structure relatively to other portions of said pickup, and each of said side arms having a stop projection extending from edge portions thereof and shaped to stop rotation of said stylus drive structure when it is turned to either one of its two stylus positions.

4. A guide structure for a stylus drive structure of a phonograph pickup as claimed in claim 1, each of said side arms having a stop projection extending from edge portions thereof and shaped to stop rotation of said stylus drive structure when it is turned to either one of its two stylus positions.

References Cited in the file of this patent

UNITED STATES PATENTS

| | | |
|---|---|---|
| 2,699,470 | Koren | Jan. 11, 1955 |
| 2,702,317 | Palo et al. | Feb. 15, 1955 |
| 2,717,929 | Klingener | Sept. 13, 1955 |
| 2,820,853 | Dally | Jan. 21, 1958 |